US007886998B2

(12) United States Patent
Lesar et al.

(10) Patent No.: US 7,886,998 B2
(45) Date of Patent: Feb. 15, 2011

(54) SELF-CORRECTING PLATE GUARD MOUNTING FOR A GRINDING MACHINE

(75) Inventors: Nick J. Lesar, Palmyra, WI (US); Christopher E. Albrecht, Cambridge, WI (US)

(73) Assignee: Weiler and Company, Inc., Whitewater, WI (US)

( * ) Notice: Subject to any disclaimer, the term of this patent is extended or adjusted under 35 U.S.C. 154(b) by 886 days.

(21) Appl. No.: 11/551,229

(22) Filed: Oct. 19, 2006

(65) Prior Publication Data

US 2007/0090216 A1 Apr. 26, 2007

Related U.S. Application Data

(60) Provisional application No. 60/728,492, filed on Oct. 20, 2005.

(51) Int. Cl.

*B02C 17/16* (2006.01)
*A23K 1/14* (2006.01)
*A47J 17/14* (2006.01)

(52) U.S. Cl. ..................... 241/82.1; 241/82.4; 241/82.7

(58) Field of Classification Search ........ 241/82.1–82.7
See application file for complete search history.

(56) References Cited

U.S. PATENT DOCUMENTS

| | | | | |
|---|---|---|---|---|
| 1,514,271 A | | 11/1924 | Tilden | |
| 2,090,650 A | * | 8/1937 | Vant | 241/82.4 |
| 3,286,551 A | * | 11/1966 | Tipton | 76/101.1 |
| 3,417,800 A | * | 12/1968 | Tipton | 241/82.5 |
| 3,536,115 A | * | 10/1970 | Weiler | 241/82.5 |
| 3,542,104 A | * | 11/1970 | Anderson | 241/82.5 |
| 4,003,521 A | * | 1/1977 | Hess | 241/82.4 |
| 4,108,387 A | | 8/1978 | Weiler | |
| 5,251,829 A | | 10/1993 | Lesar | |
| 5,289,979 A | | 3/1994 | Lesar | |
| 5,344,086 A | | 9/1994 | Lesar | |
| 5,405,095 A | | 4/1995 | Lesar | |
| 5,409,172 A | | 4/1995 | Lesar | |
| 5,443,214 A | * | 8/1995 | Lesar | 241/82.2 |
| 2001/0052558 A1 | * | 12/2001 | Younker | 241/82.1 |

FOREIGN PATENT DOCUMENTS

| | | |
|---|---|---|
| EP | 1201312 | 5/2002 |

* cited by examiner

*Primary Examiner*—Bena Miller
(74) *Attorney, Agent, or Firm*—Boyle Fredrickson, s.c.

(57) ABSTRACT

Self-correcting plate guards for installation over an orifice plate of a grinding machine are disclosed. Each plate guard has studs that fit into apertures of an orifice plate. The studs and apertures are sized so that the correct guard must be used with a particular orifice plate. Furthermore, the mounting ring that holds the orifice plate in place on the grinding machine cannot be tightened for use of the grinding machine without the plate guard being installed.

12 Claims, 17 Drawing Sheets

FIG. 9
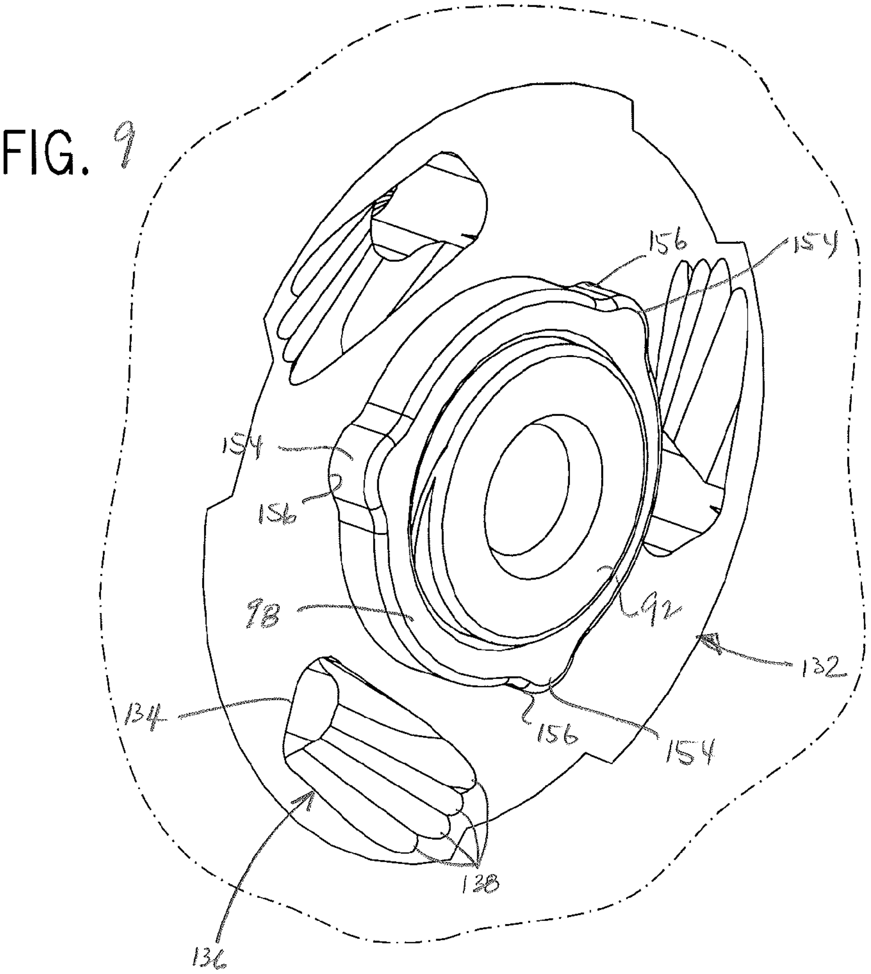
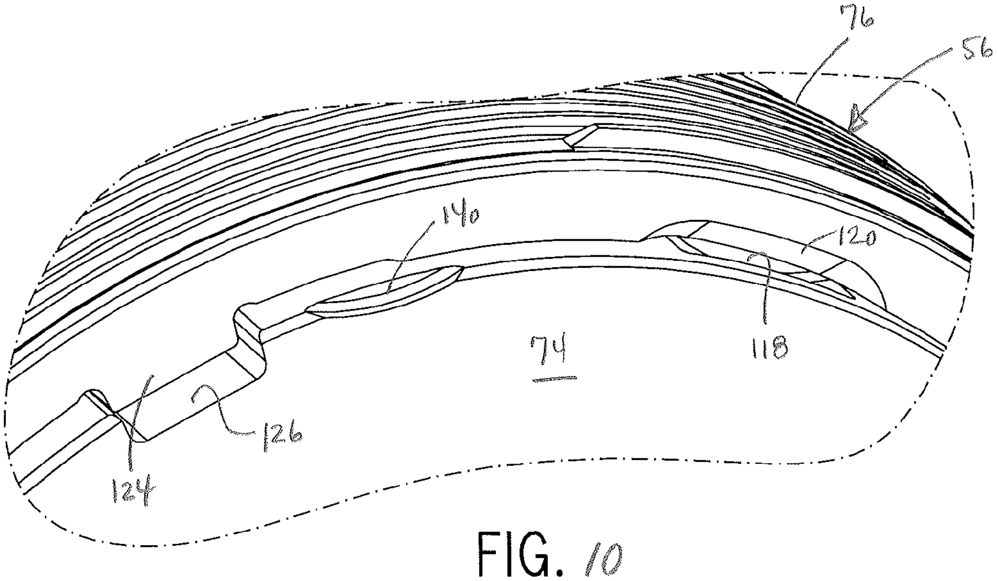
FIG. 10

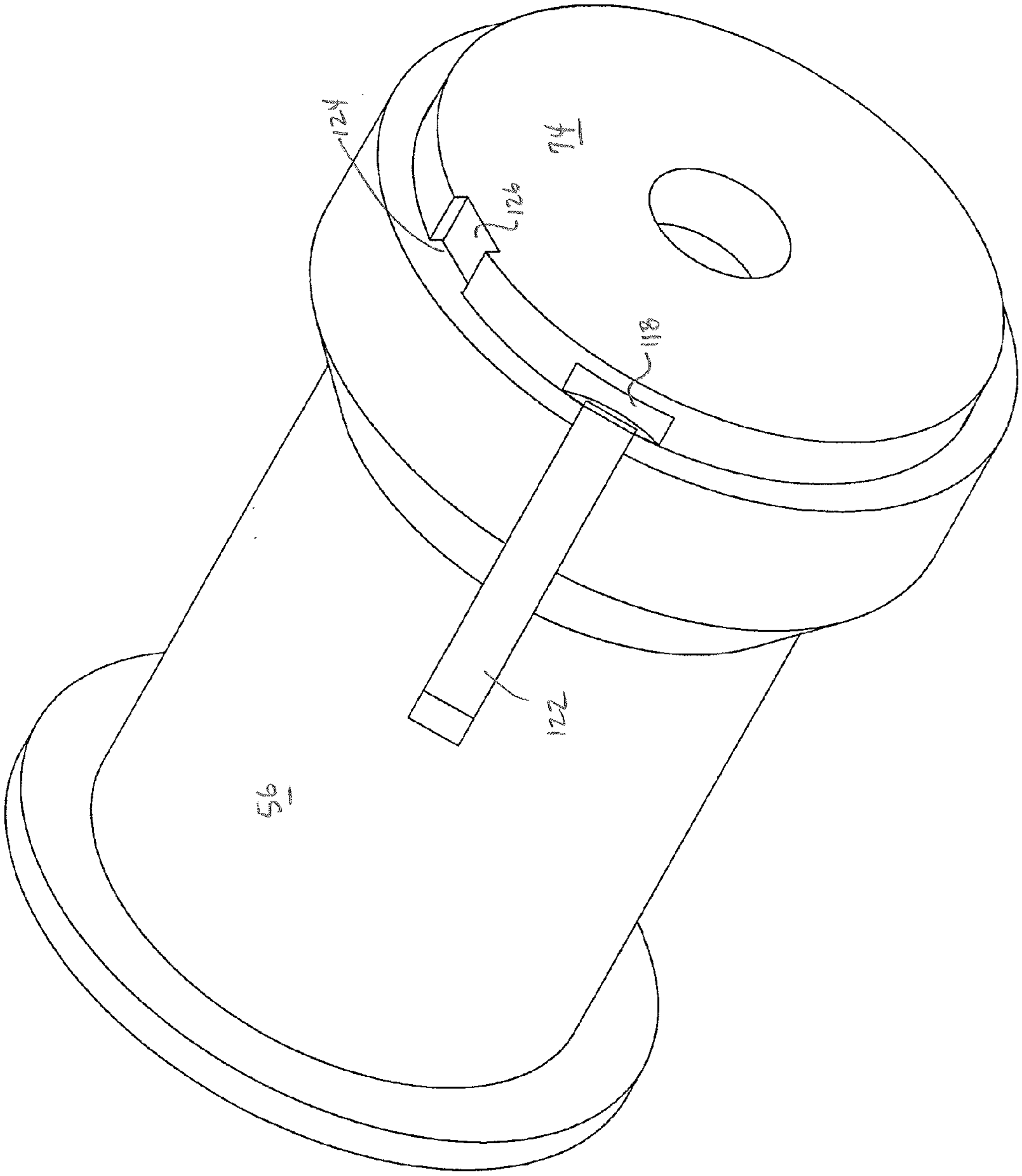
FIG. 10-A

Fig. 10-B
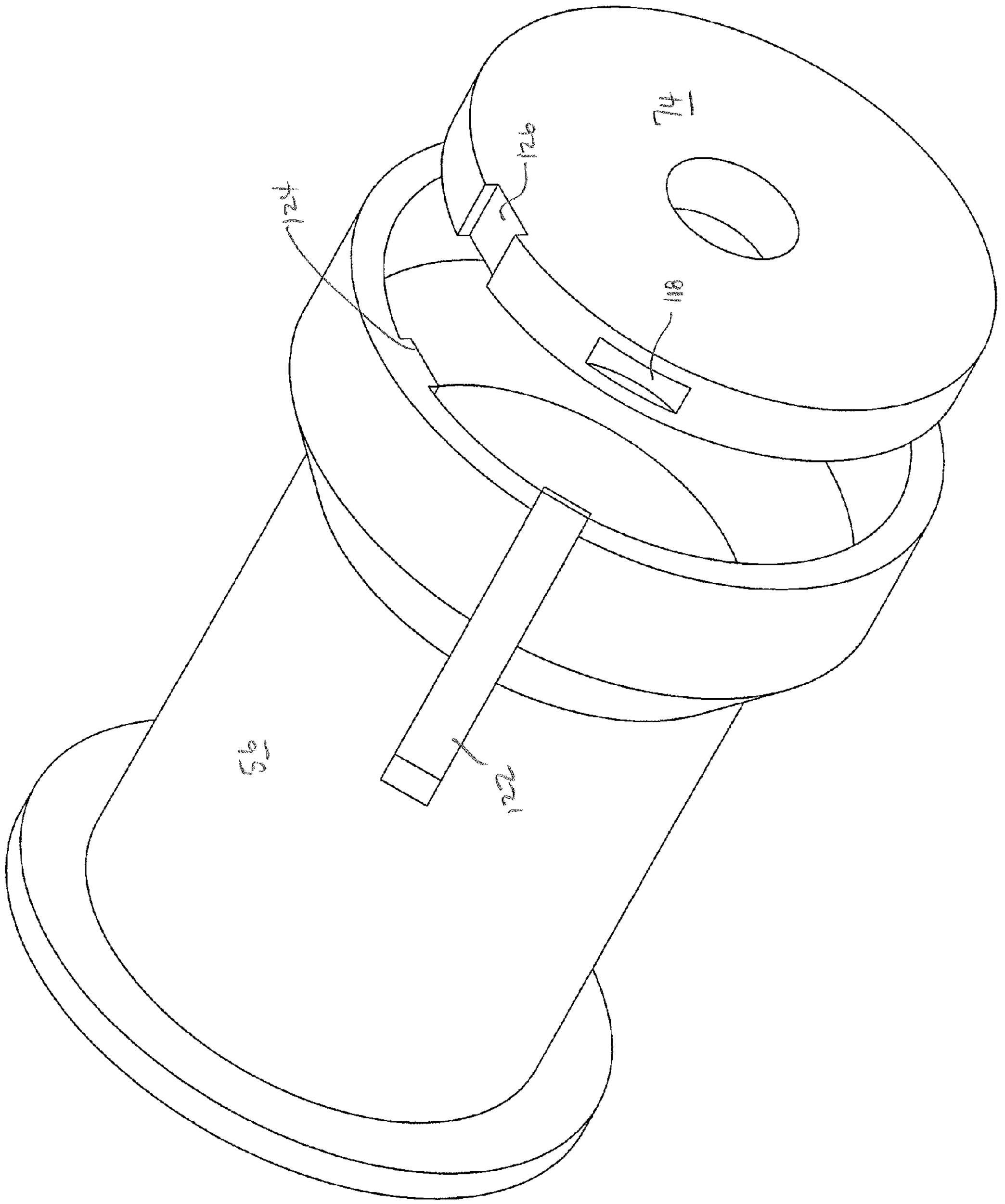

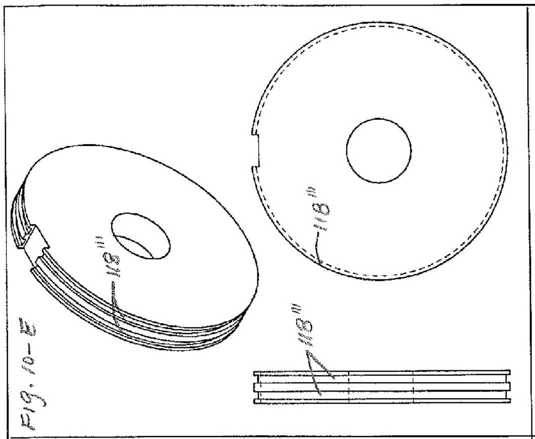
Fig. 10-E
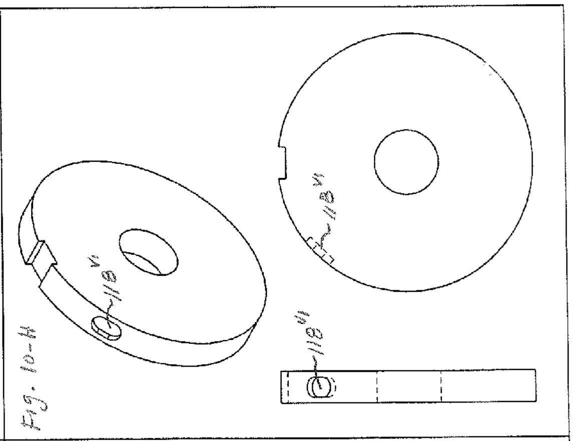
Fig. 10-H
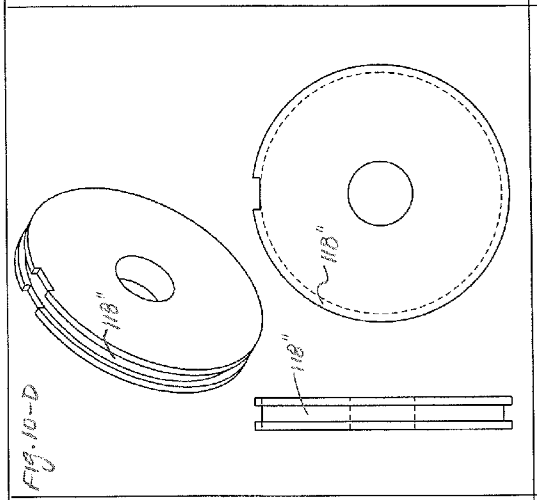
Fig. 10-D
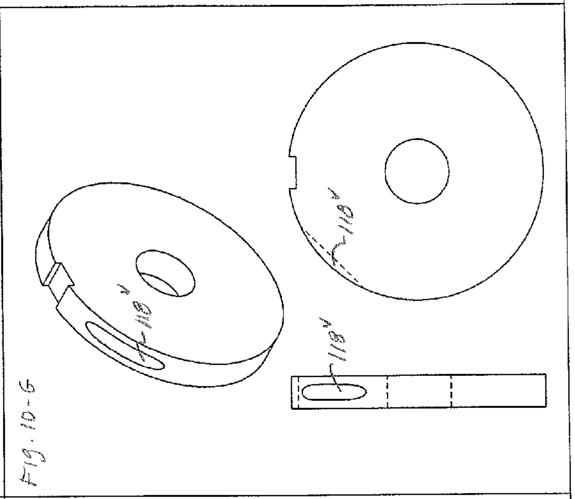
Fig. 10-G
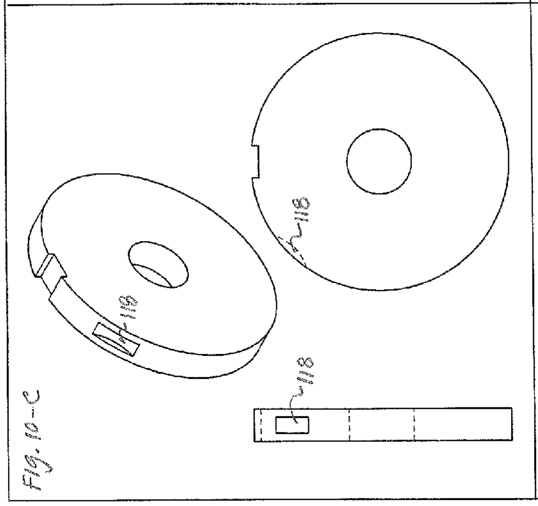
Fig. 10-C
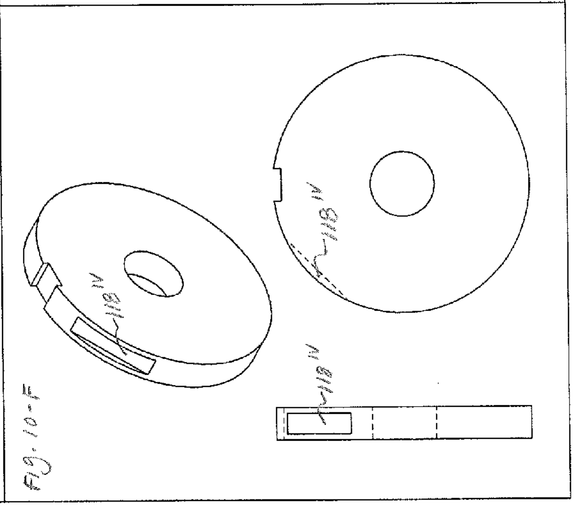
Fig. 10-F

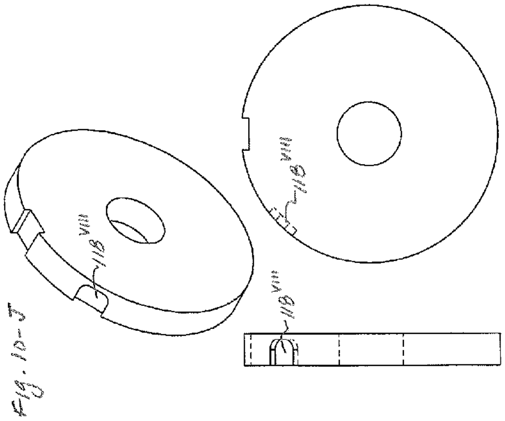
Fig. 10-J
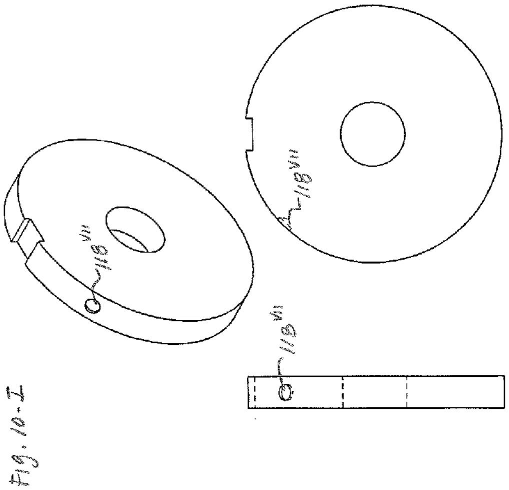
Fig. 10-I

FIG. 13
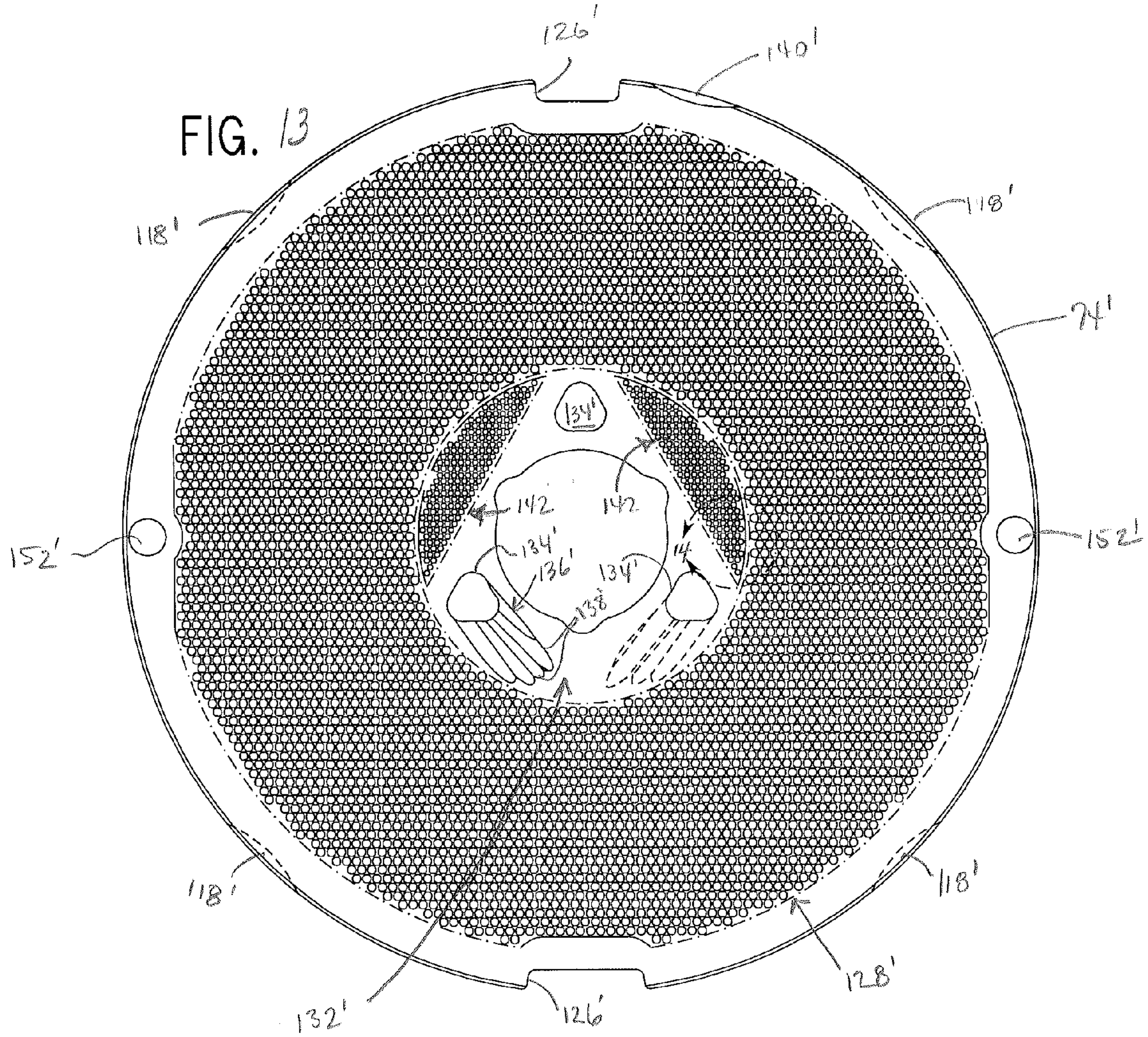
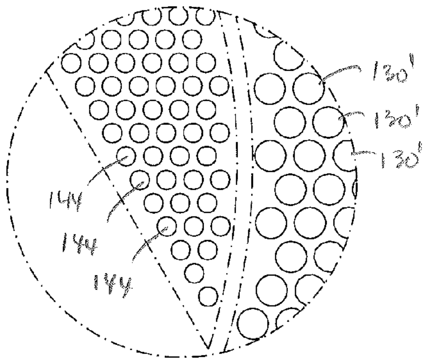
FIG. 14

SELF-CORRECTING PLATE GUARD MOUNTING FOR A GRINDING MACHINE

CROSS-REFERENCE TO RELATED APPLICATION

This application claims priority under 35 U.S.C. §119(e) to U.S. Provisional Application Ser. No. 60/728,492, filed Oct. 20, 2005, the contents of which are hereby incorporated by reference in their entirety.

FIELD OF THE INVENTION

The present invention relates to a grinding head of a meat grinder, and more particularly, relates to improved design and function of parts of a grinding head that improve the meat grinding process in terms of ease of disassembly and reassembly, safety, increased quality and output, reduced cost of production of parts, and reduced need for replacement parts.

DISCUSSION OF THE RELATED ART

The general structure of grinding machines is well known. Typically, a grinding machine has a hopper into which the material to be ground is placed, a grinder portion, including a grinding head, a mounting ring, a bridge, and a collection tube. A feed screw is located within the grinding head to advance material in the hopper through the head. A knife assembly is mounted at the end of, and rotates with, the feed screw and, in combination with the orifice plate, serves to grind material that is advanced toward the orifice plate by the feed screw. The feed screw has a bore at its downstream end into which a center pin is inserted. The center pin extends through a central passage of the knife assembly, and through a bushing that is positioned in a central opening of the orifice plate. A collection cone is located downstream of the orifice plate and is secured to the bushing. The orifice plate is comprised of an outer section having a plurality of grinding apertures and an inner section having at least one collection passage. The collection passage or passages of the orifice plate lead to a collection structure defined by the collection cone, which generally includes a collection cavity and a discharge passage. An orifice plate guard is located downstream from the orifice plate and maintains the collection structure in place, and a mounting ring holds the guard against the orifice plate and mounts the intervening structures to the body of the grinding head.

BACKGROUND OF THE INVENTION

Improvements in grinding machines are generally directed at one of four goals: (1) improved separation of hard materials from useable materials and increased output of useable materials; (2) ease of disassembly and reassembly of the grinding head; (3) operator safety; and (4) reduction of costs in terms of production and replacement of parts.

The quality of meat produced by a grinding machine is limited by its ability to remove hard materials from the useable materials. Naturally, it is preferable if this can be done in a way that maximizes output of useable materials. Modifications of prior meat grinders that improve separation of hard materials while also improving output of useable materials are highly desirable.

Because grinding machines are intended for use with food products, frequent disassembly is required for maintaining sanitation. The various parts of the grinding machine must therefore be readily disassembled and accurately reassembled for maximum efficiency. Modifications of existing meat grinders that improve an operator's ability to disassemble the grinder parts and that assure proper reassembly of the parts are therefore also highly desirable.

Naturally, operator safety is also a concern for owners and operators of meat grinders alike. Modifications of present meat grinders that improve safety, especially when those improvements do not detract from overall cost or efficiency, are also desirable.

Finally, various parts of a grinding machine are subject to tremendous force and rotational stresses, and wear to these parts is expected. However, the overall cost of grinding machines and various replacement and wear parts is typically very high. Modifications that reduce the costs of producing various parts or that reduce wear, and thus frequency of the need for replacement parts, are therefore also desirable.

The present invention contemplates modifications to a meat grinding machine that maximizes the output of useable ground material without sacrificing quality, improves efficiency in disassembly and reassembly of the machine, improves operator safety, and reduces overall production costs and costs required for replacement parts.

SUMMARY OF THE INVENTION

In one aspect of the grinding machine of the present invention, a grinding head defines an axial bore, and the bore has a plurality of flutes. The width of the flutes is variable across the length of the bore, and is dimensioned to perform various functions. For example, the flutes may be dimensioned to generally decrease in width from the upstream end of the bore to the downstream end of the bore, or may be increased in size in areas of high shear, or may be adjusted across the angles of the bore, as the situation demands. Not only does the variable dimensioning of flutes within the bore of the grinding head control the flow of material through the head, the provisions of flutes in the head is also cost-effective since flutes can be cast along with head rather than being machined in the head or requiring additional parts, such as bars, to be welded to the head.

In another aspect of the grinding machine of the present invention, assembly of the grinding head is simplified and made consistent between grinder operators. Because the grinder head must be frequently disassembled and reassembled for cleaning, ease of assembly and consistent reassembly is desirable. One aspect of the grinding machine of the present invention includes provision of a stop portion within the bore of the grinder head so that the orifice plate can be inserted to the correct depth within the bore with each reassembly sequence. In another aspect of the grinding machine of the present invention, a tensioning device is mounted between the feed screw and knife assembly for application of constant pressure, urging the knife assembly against the orifice plate. This ensures that the knife assembly contacts the orifice plate with sufficient force to grind material as desired, but prevents premature wear of the grinder parts.

In an aspect of the grinding machine of the present invention that eases disassembly of the grinder head for cleaning, recesses such as slots are provided on the outer edge of the orifice plate, and corresponding removal recesses may be provided at the adjacent end of the grinder head. The combination of the orifice plate slots and the grinder head recesses allows an operator to insert a tool into one of the grinder head recesses to access an orifice plate slot and apply leverage to the orifice plate, thus removing it from the opening of the head despite any ground material that may have become lodged between the parts. Two or more corresponding orifice plate recesses and grinder head recesses are provided around the diameter of the orifice plate and adjacent grinding head for application of leverage at more than one location.

In yet another aspect of the grinding machine of the present invention, the grinding machine has improved ability to separate hard material, such as bone and gristle, from soft ground material because pieces of hard material are too large to pass through the grinding openings of the orifice plate. The knife inserts push these pieces of hard material toward the center of the plate by rotation of the knife assembly. It has been known to remove hard material from the primary stream of ground material through use of hard material collection passages located inwardly on the orifice plate relative to the grinding openings. Furthermore, providing the collection passages with ramped entryways opening onto the surface of the orifice plate to shear the hard material and to encourage movement of hard pieces through the collection passages has been effective. In a further improvement of this system, flutes are provided along the ramped entryway leading from the surface of the orifice plate to the collection passage. The raised areas of the flutes provide friction that helps keep pieces of hard material within the recessed area of the ramped entryway, while the grooved aspect of the flutes encourages migration of hard material toward the collection passages. In addition to increasing efficiency of hard material collection, the use of fluted entryways decreases production costs of the orifice plate, since a conventional end mill can be used to form the flutes rather than requiring machined entryways.

Another aspect of the orifice plate includes a secondary grinding section located inwardly on the orifice plate relative to the grinding openings, along with collection passages. Again, because hard material is pushed toward the inner section of the plate by the rotating motion of the knife assembly, but is carried in a substantial quantity of soft, usable material, further separation of soft, usable material is desirable. Providing a secondary grinding section at the intersection of the orifice plate allows additional soft material to be routed to the main ground material stream rather than being collected in the hard material collection passages for further processing or discard.

Alignment of the orifice plate within the opening of the grinding head has been discussed in relation to improving the ease of disassembly for cleaning. In addition, alignment of the orifice plate in a particular orientation with respect to the grinding head is required when secondary grinding sections are provided, since the downstream collection apparatus will necessarily have an irregular shape, allowing additionally acquired ground materials to enter the main stream of ground materials. In some embodiments, the collection apparatus downstream of the orifice plate also bears collection channels that must be aligned with the collection passages of the plate. In order to ease assembly of the grinder and ensure proper alignment of the orifice plate within the grinder head, a self-correcting installation feature is provided. The self-correcting feature preferably comprises a pair of lugs on the head portion and a corresponding pair of recesses on the orifice plate. One of the lugs is preferably larger than the other, and is preferably sufficiently larger than the other to allow a user to readily visually identify which lug corresponds to which recess. In any case, the orifice plate cannot be inserted if the operator misjudges the sizes of the lugs and recesses and the orifice plate is not correctly oriented.

In an aspect designed to improve safety for the operator without detracting from the ease of use of the machine, the invention contemplates a self-correcting plate guard mounting arrangement. Guards are typically used to ensure that a grinder operator cannot intentionally or inadvertently access the grinder head during use, yet allow the operator maximum visibility in order that he or she may monitor progress of the grinding operation. To that end, an orifice plate having small grinding openings, can be used with a guard having larger openings, while an orifice plate having larger grinding openings requires the use of a more closed guard. Each guard is provided with studs for mounting within apertures on an orifice plate, and the corresponding apertures of the orifice plate will accept only studs from guards rated safe for the particular orifice plate. As with the self-correcting installation of the orifice plate in the grinding head, this is accomplished through stud size. It is contemplated that a plate with relatively large grinding openings will only accept small studs of restricted guards. Less restrictive guards are available for orifice plates having smaller apertures, but the more highly restrictive guards can be used as well. In addition, the mounting ring is sized so that it cannot be tightened sufficiently without a guard present. This ensures maximum flexibility of use of guards while requiring appropriate guard use.

In yet another aspect of the present invention, a system is provided in order to extend the life of certain parts that are used in the machine. Wherever moving parts are employed, wear is to be expected. However, wear can be distributed over an assembly of parts by providing evenly spaced projections and recesses between any two parts in a rotating assembly. For example, the bushing held in place at the center bore of the orifice plate has traditionally been held in place by way of a single key-and-keyway arrangement. However, over time, the single key-and-keyway is subjected to wear and, despite the operability of the remainder of the part, would require replacement. In this aspect of the present invention, a plurality of evenly radially spaced projections and corresponding evenly radially spaced channels or recesses increases the life of the bushing despite consistent wear stresses in one location, since the bushing is randomly inserted into the plate in any number of different positions at each reassembly. Similarly, the pin inserted in the central bore of the feed screw has been improved by providing a plurality of radially evenly spaced recesses and corresponding keys or projections for the knife holder. The random installation of the knife holder on the pin extends the life expectancy of the pin.

After hard material is removed from the main ground material stream via the collection passages, it is still carried in a substantial quantity of soft, useable material. Another aspect of the grinding machine of the present invention contemplates a helical discharge passage provided in the collection structure downstream of the orifice plate that improves separation of hard material by providing a highly restricted flow toward the discharge passage. As a result, useable material tends to remain in the collection cavity of the collection structure, while primarily hard material is discharged.

The various features and aspects of the present invention as summarized above may be incorporated in a machine separately from each other, and each provides certain advantages in improving operation in terms of ease of disassembly and reassembly, safety, increased quality and output, reduced cost of production of parts, and reduced need for replacement parts. It is also understood that the various features and aspects may be incorporated in separate combinations or altogether.

Various other features, objects and advantages of the present invention will be made apparent from the following detailed description taken together with the drawings, which together disclose the best mode presently contemplated of carrying out the invention.

BRIEF DESCRIPTION OF THE DRAWINGS

Preferred exemplary embodiments of the invention are illustrated in the accompanying drawings, in which like reference numerals represent like parts throughout, and in which:

FIG. 9 is a partial isometric view of the orifice plate as shown in FIG. 8;

FIG. 10 is a close-up isometric view of the edge of the orifice plate seated in the grinder head;

FIG. 10-A is an alternate view of the grinder head and orifice plate showing use of a removal tool;

FIG. 10-B is a view similar to FIG. 10*a*, shown with the orifice plate removed from the grinder head;

FIGS. 10-C-10-J show alternate embodiments of the removal feature of the orifice plate as in FIGS. 10-A and 10-B;

FIG. 13 is an alternate embodiment of the orifice plate of one aspect of the present invention showing a secondary grinding section;

FIG. 14 is a close-up detail view taken along line 14-14 in FIG. 13;

DETAILED DESCRIPTION OF THE PREFERRED EMBODIMENTS

1. Resume

Figure 1:
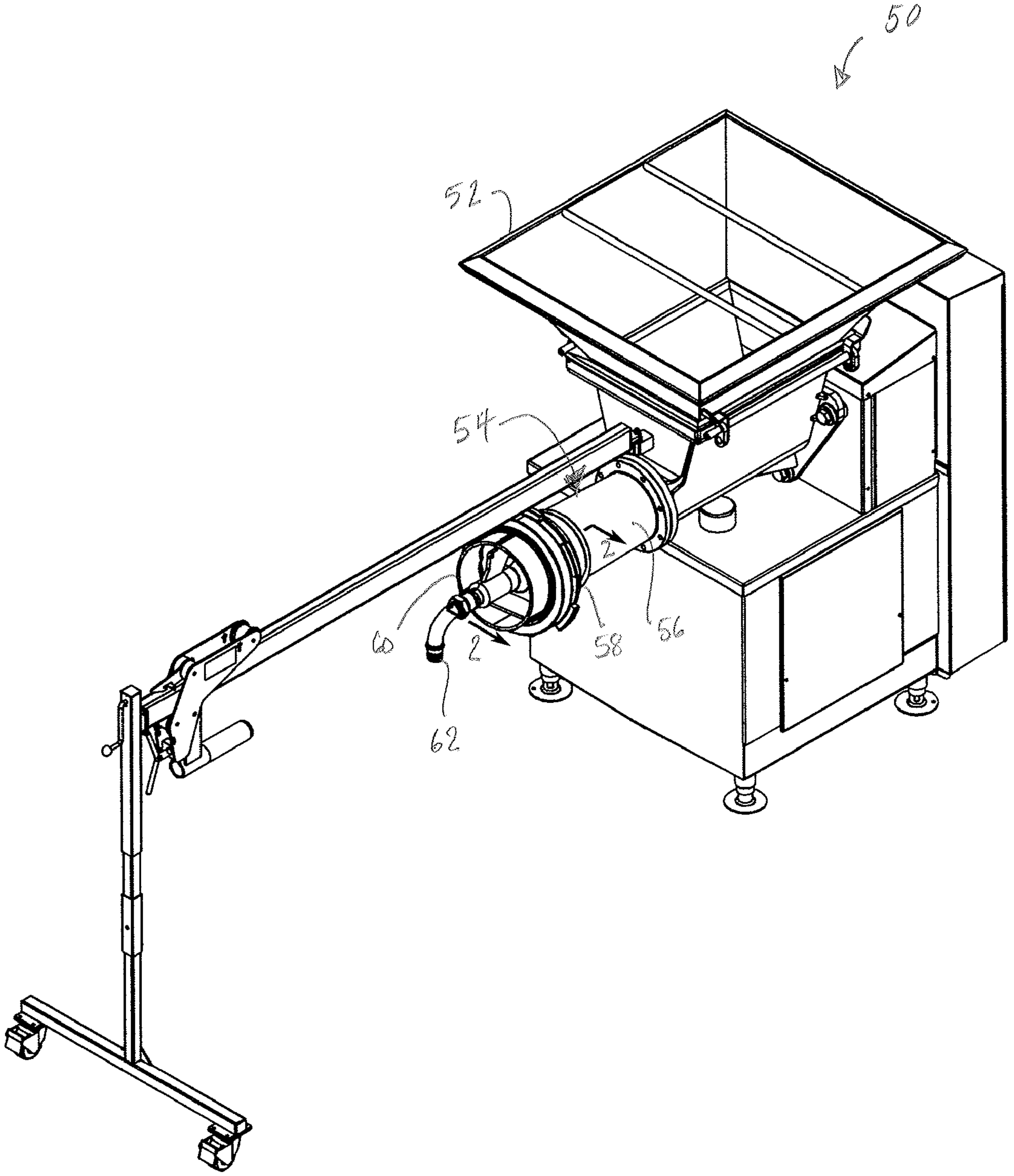
FIG. 1 is an isometric view of a grinding machine incorporating the various aspects of the present invention.

A grinding machine 50 is generally shown in FIG. 1. Grinding machine 50 has a hopper portion 52 and a grinder portion 54. Grinder portion 54 includes a housing or head 56, a mounting ring 58, a bridge 60, and a collection tube 62.

Figure 2:
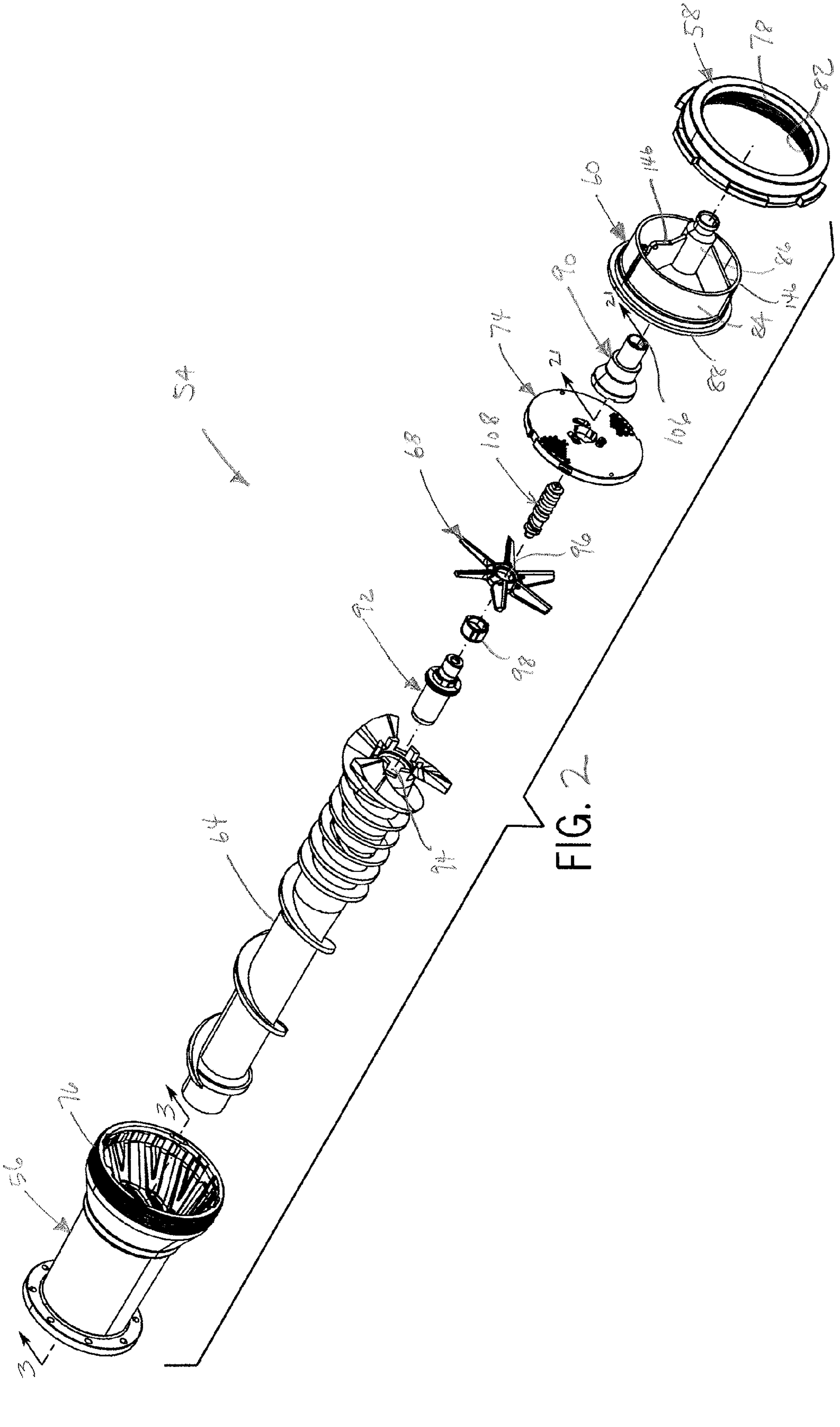
FIG. 2 is an exploded view of the grinder head, showing each internal and external part (except the collection tube), with reference to line 2-2 of FIG. 1.
Figure 4:
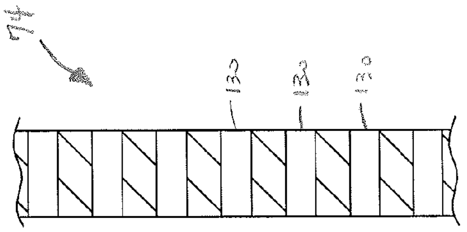
FIG. 4 is a close-up sectional side view of a portion of the orifice plate taken along line 4-4 of FIG. 3.

Referring now to FIG. 2, head 56 is generally tubular and a feed screw 64 is rotatably mounted within head 56 so that, upon rotation of feed screw 64 within head 56, meat or the like is advanced from hopper 52 through the interior of head 56. A knife holder 68 is mounted at the end of, and rotates with, feed screw 64. Knife holder 68 has six arms 70*a-f* and six knife inserts, one corresponding to each of arms 70*a-f*, although it is understood that any number of arms and corresponding inserts may be employed.

Figure 3:
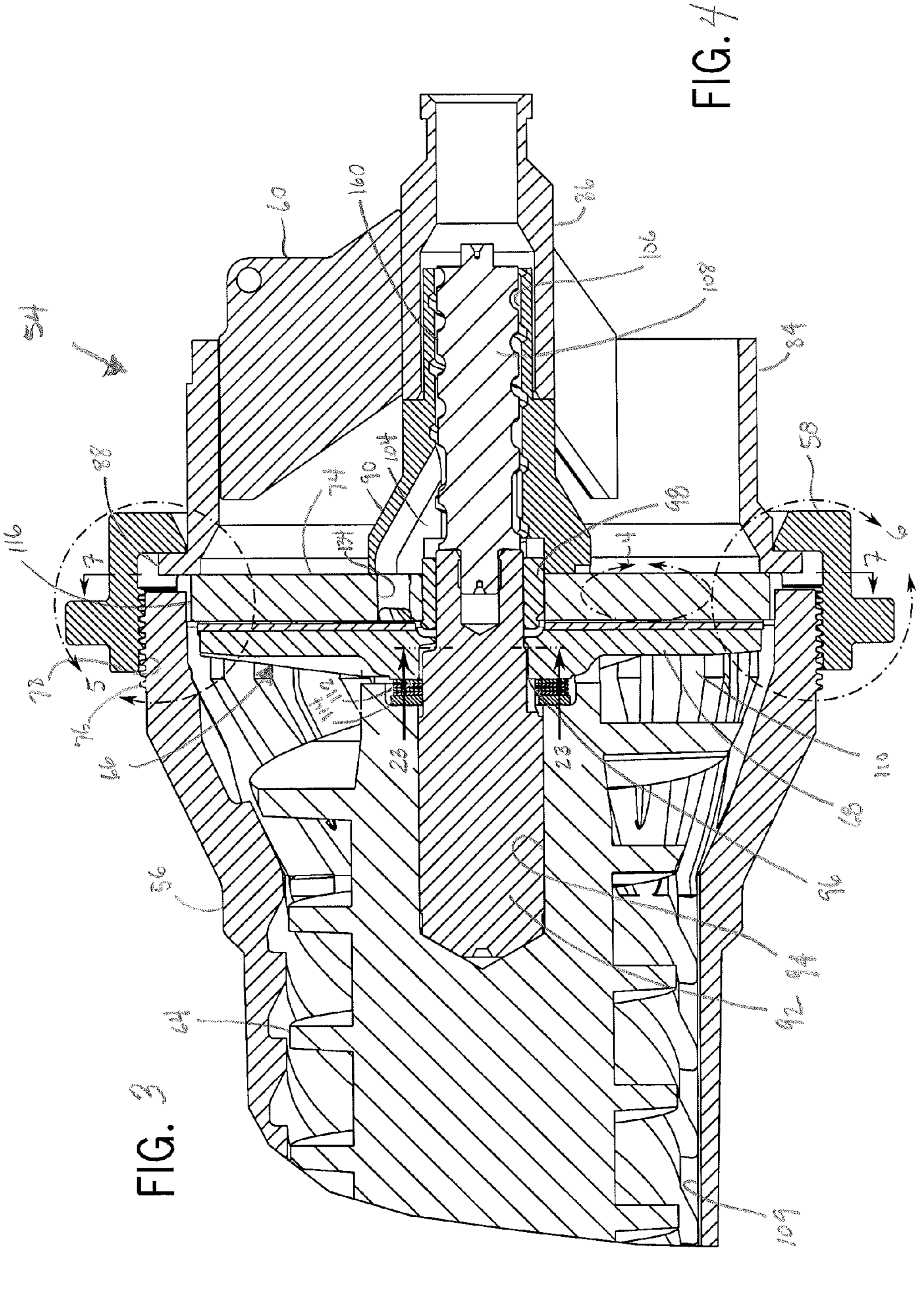
FIG. 3 is a sectional side view showing a portion of the head taken along line 3-3 in FIG. 2.

Referring now to FIG. 3, knife holder 68 is located adjacent an inner grinding surface of an orifice plate 74, which is secured in the open end of head 56 by mounting ring 58 and bridge 60. The knife inserts bear against the inner grinding surface of orifice plate 74. In accordance with known construction, the end of head 56 is provided with a series of external threads 76, and mounting ring 58 includes a series of internal threads 78 adapted to engage external threads 76 of head 56. Mounting ring 58 further includes an opening 80 defining an inner lip 82. While a threaded connection between mounting ring 58 and head 56 is shown, it is understood that mounting ring 58 and head 56 may be secured together in any satisfactory manner.

Bridge 60 includes an outer, plate maintaining portion 84 and an inner, collection assembly maintaining portion 86 as shown in FIG. 2. Outer portion 84 of bridge 60, which further includes an outwardly extending shoulder 88 adapted to fit within lip 82, is held within ring 58 and shoulder 88 engages the outer peripheral portion of orifice plate 74 to maintain orifice plate 74 in position within the open end of head 56, as most clearly seen in FIG. 6. Inner portion 86 of bridge 60 is generally tubular and retains a collection cone 90 at its upstream end and collection tube 62 at its downstream end.

Figure 7:
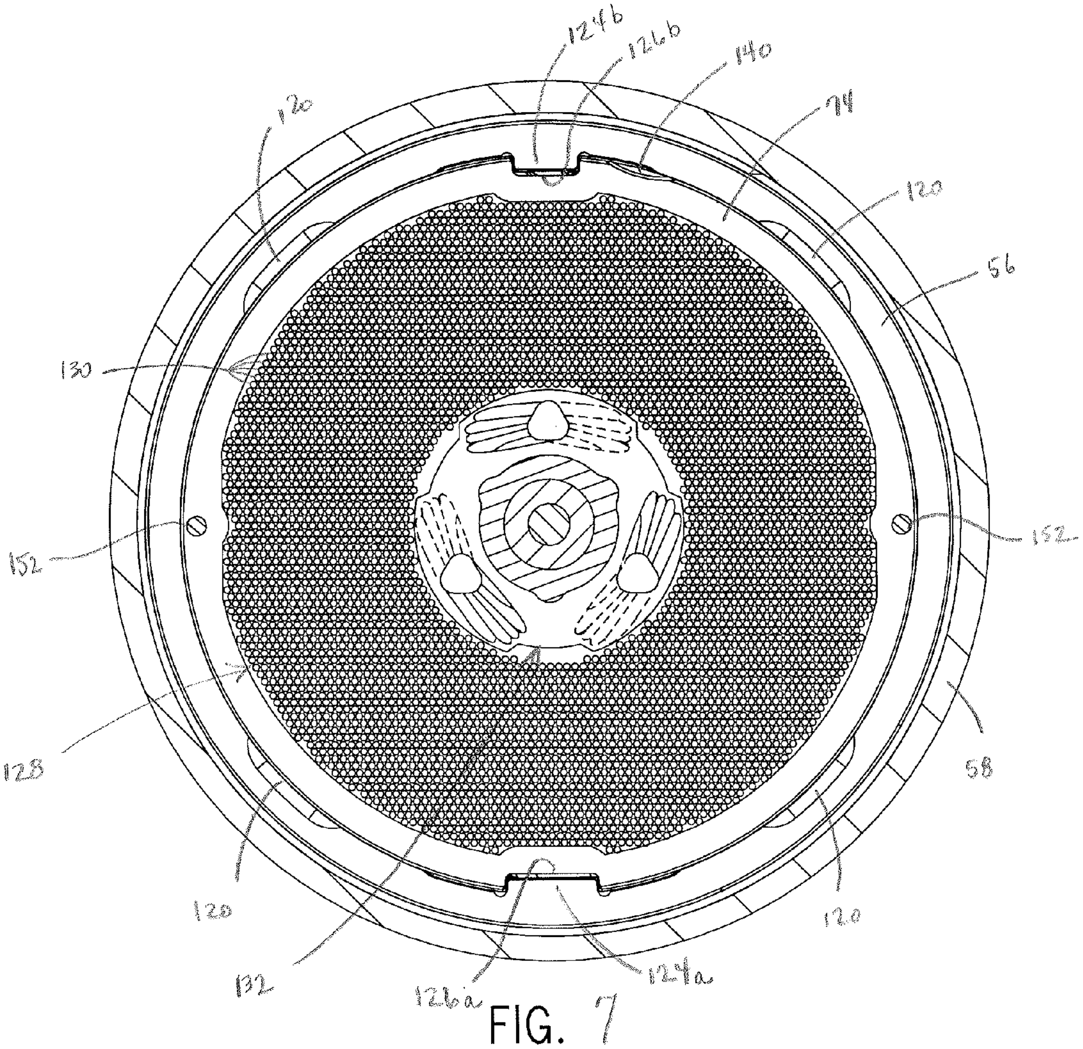
FIG. 7 is section view, taken along line 7-7 of FIG. 3, showing the orifice plate mounted in the head.
Figure 21:
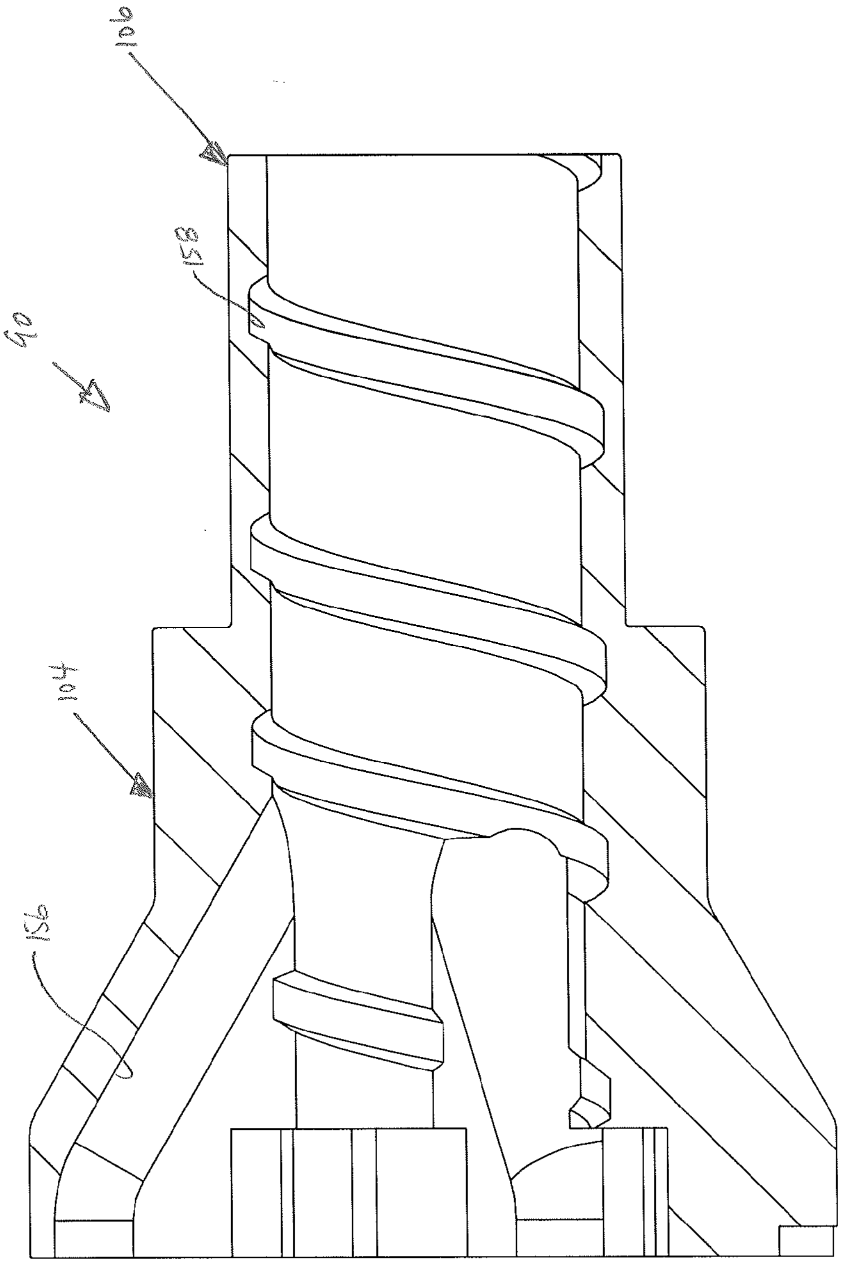
FIG. 21 is a sectional side view of a preferred embodiment of the collection cone of the present invention.
Figure 22:
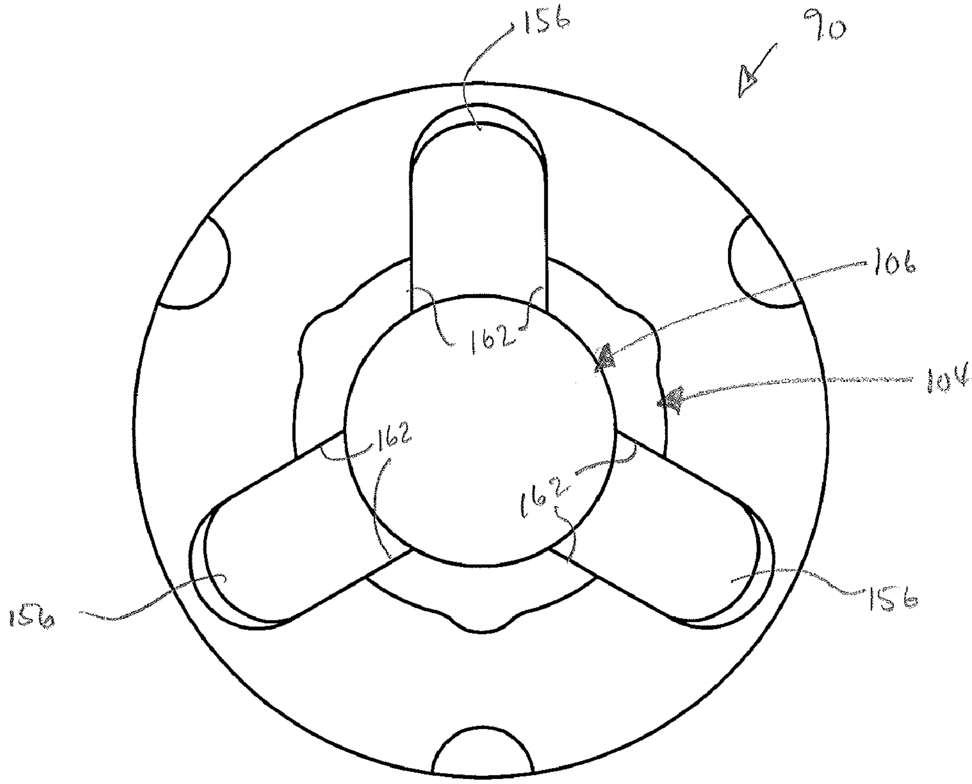
FIG. 22 is an end view of the collection cone shown in FIG. 21, taken from the upstream end.
Figure 23:
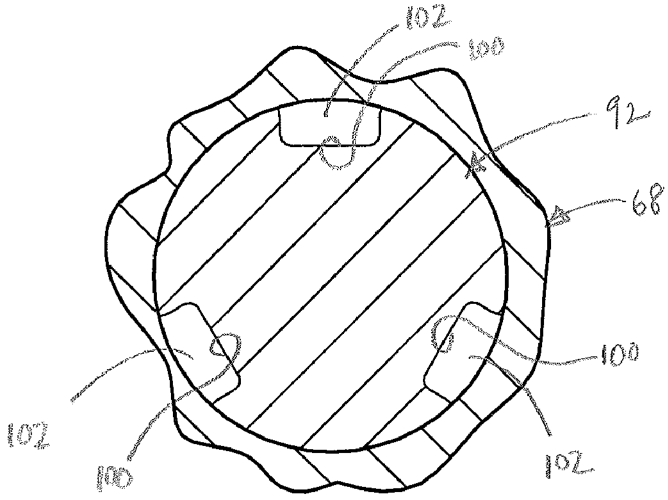
FIG. 23 is a sectional view of the connection between the pin and the knife holder, taken along lines 23-23 of FIG. 3.

A center pin 92 has its inner end located within a central bore 94 formed in the end of feed screw 64, shown in FIGS. 7 and 9, and the outer end of center pin 92 extends through a central passage 96 formed in a central hub area of knife holder 68 and through the center of a bushing 98. Bushing 98 supports center pin 92, and thereby the outer end of feed screw 64, and also functions to maintain collection cone 90 in position against the outer surface of orifice plate 74. As best seen in FIG. 23, center pin 92 is keyed to feed screw 64 by means of recessed keyways 100 on center pin 92 that correspond to keys 102 on the hub of knife holder 68. With this arrangement, center pin 92 rotates in response to rotation of feed screw 64, driving knife assembly 66. Bushing 98 and orifice plate 74 remain stationary, and rotatably support the end of center pin 92 to which an auger 108 is secured. As further seen in FIGS. 21 and 22, collection cone 90 includes a collection cavity 104 and a discharge passage 106. Auger 108 is driven by feed screw 64, and extends through collection cavity 104 and into and through discharge passage 106. Discharge passage 106 empties into collection tube 62.

2. Head Flute Profile Variation

Figure 11:
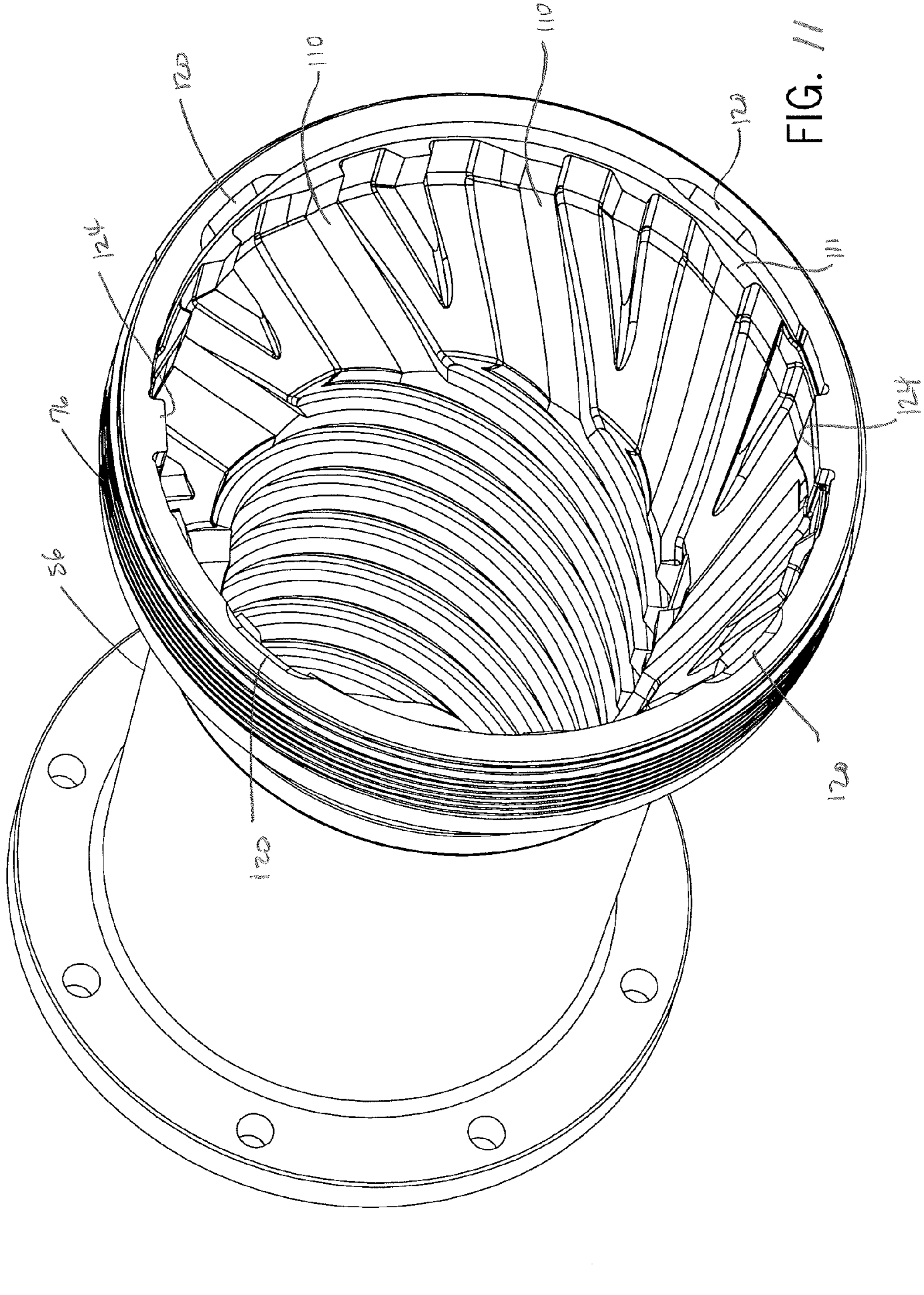
FIG. 11 is an isometric view of the grinder head of a preferred embodiment of the present invention, showing the variable flutes located in the bore of the head.
Figure 12:
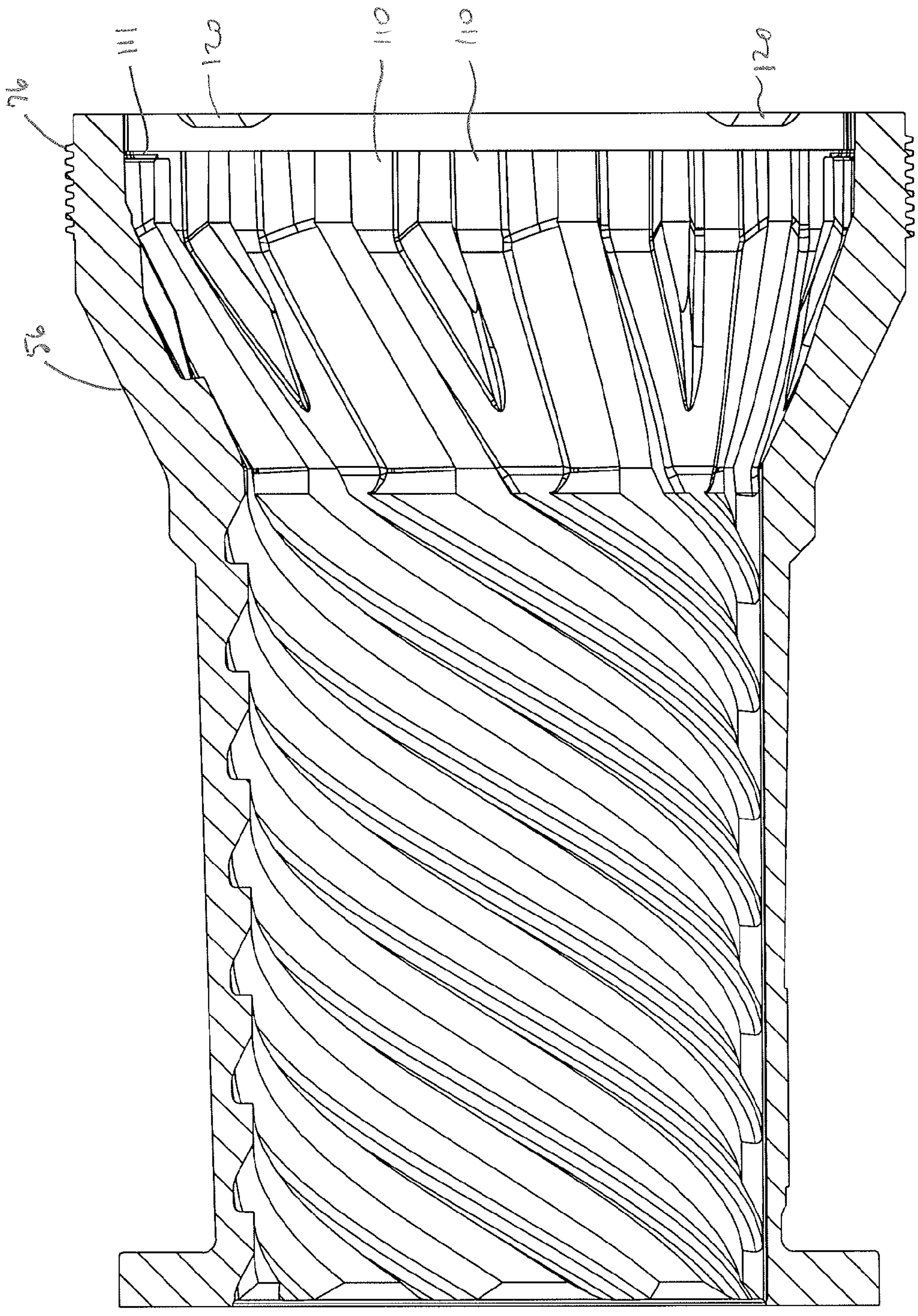
FIG. 12 is a longitudinal sectional view of the grinder head shown in FIG. 11.

Referring now to FIGS. 3, 11 and 12, head 56 is generally tubular and thus comprises an axial bore 109 in which feed screw 64 is rotatably mounted. Bore 109 is typically provided with flutes 110 for controlling the flow of material through head 56, i.e. for preventing material from simply rotating with feed screw and for providing a downstream flow path to prevent backpressure from pushing material back into hopper 52.

In a preferred embodiment of the present invention, the dimension of flutes 110 is varied along the flute length to produce different effects. For example, decreasing the size of flutes 110 in the direction of material flow can increase production rates while reducing the potential for material backflow between flutes 110. Flutes 110 may also be increased in size in areas of high pressure in order to provide additional strength. Flutes 110 can also have an increased width in areas of high shear, where material slipping in feed screw 64 can destroy the material (such as by extracting fat) rather than merely grinding the material.

Note that head 56 may have an increased diameter at its downstream end. Flutes 110 may be primarily located adjacent or along this increased diameter area. Flutes 110 may be dimensioned to move material more efficiently across the transition area between the main body of head 56 and the increased diameter area of head 56. Other modifications to the dimensions of flutes 110 across their length or across the angles of bore 109 could match the requirements of specific functional areas. Advantageously, flutes 110 can be cast along with head 56, which is an easier and less costly process than the current production method, which requires heads to have areas machined flat or have rolled bars welded therein.

3. Constant Force Assembly

Frequent disassembly and reassembly of grinder 54 is required for maintaining sanitary conditions. In the past, the force applied by knife assembly 66 against orifice plate 74 has been adjusted by screwing ring 58 onto head 56 during reassembly. Different operators have inevitably assembled the grinder differently after cleaning, which results in different operation since the force applied by the knife inserts 72 on the orifice plate 74 is determined by the position of the ring 58 on the head 56. For example, when ring 58 is not advanced to at least a certain point, knife assembly 66 could fail to contact orifice plate 74 with sufficient force, and no (or unsatisfactory) cutting action would occur. On the opposite extreme, when ring 58 is tightened too far, knife inserts 72 and the grinding surface of orifice plate 74 wear prematurely. Variations between these extremes result in various degrees of sub-optimal operation and wear of grinder 54.

Figure 6:
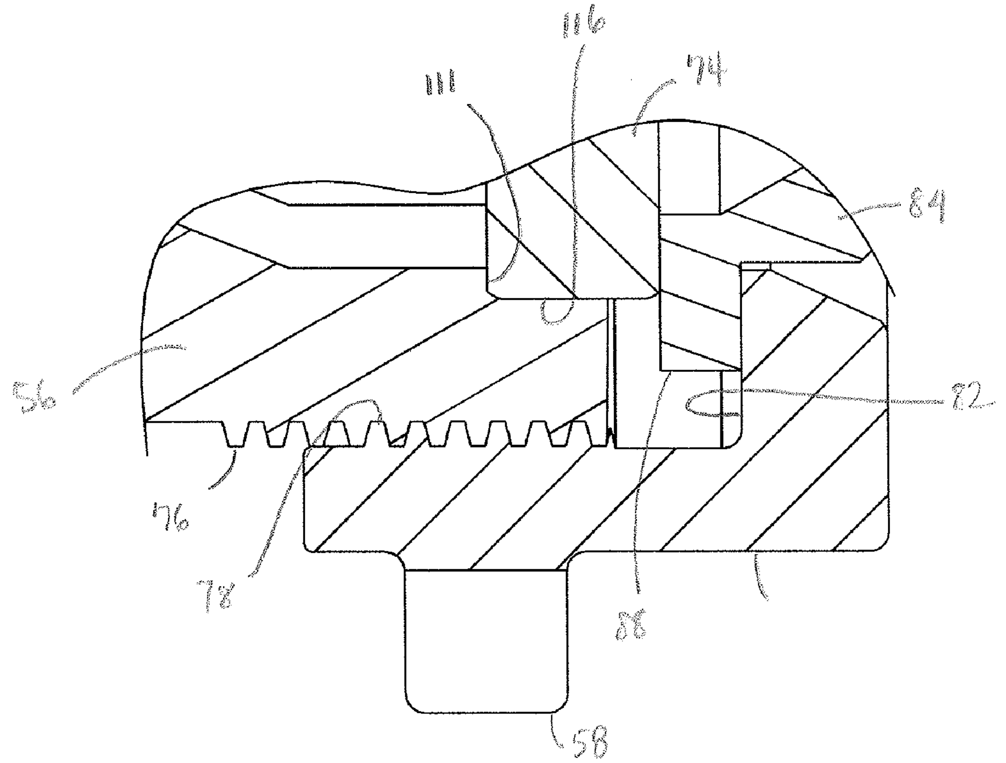
FIG. 6 is a close-up sectional side view of a portion of the head, orifice plate, bridge, and mounting ring taken along line 6-6 of FIG. 3.

To reduce the variations due to operator assembly, in the present invention, head 56 is provided with an interior shoulder or stop 111, best seen in FIGS. 3 and 6, against which orifice plate 74 is seated when ring 58 is advanced onto head 56 during assembly. Stop 111 provides a positive stop for orifice plate 74 at a predetermined optimum position within head 56, so that orifice plate 74 cannot be forced against knife assembly 66 by overtightening or other operator adjustment. In addition, an operator can know not to stop advancing orifice plate 74 until it engages stop 111, which provides the operator with immediate feedback that orifice plate 74 is in the desired position within head 56.

Referring to FIG. 3, a spring pack 112 is located between feed screw 64 and knife assembly 66 to provide a constant pressure between knife assembly 66 and orifice plate 74 when orifice plate 74 is seated against stop 111 upon advancement of ring 58. Spring pack 112 preferably consists of a Belleville-type spring washer assembly, but could also use coil springs. A spacer washer 114 holds spring pack 112 in place on center pin 92 and out of contact with feed screw 64. Alternately, a spring assembly may be mounted behind the center pin.

4. Orifice Plate Removal Slots

As noted above, frequent disassembly of the various parts of grinder 54 is required for cleaning. In operation, it is common for ground material to become lodged between the interior surfaces of head 56 and the annular outer surface 116 of orifice plate 74, making removal of plate 74 from head 56 difficult. An operator would be required to tap or pound on plate 74 until it became dislodged, a practice which is time consuming and creates potential for damage to orifice plate 74.

Figure 5:
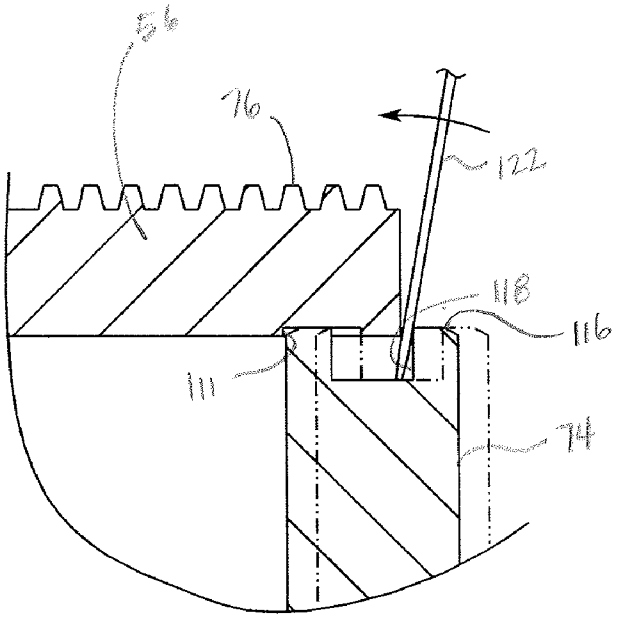
FIG. 5 is a close-up sectional side view of a portion of the head and orifice plate, taken along line 5-5 of FIG. 3, and showing use of a tool to remove the orifice plate from the head.

As seen in FIGS. 5, 7, 10, 10-A, and 10-B, in the present invention, plate 74 is provided with removal recesses or other relief areas that enable plate 74 to be removed relatively easily from head 56. The recesses or relief areas may be in the form of slots 118, and head 56 may be provided with corresponding removal recesses or grooves 120. When it is time to disassemble grinder 54 for cleaning, an operator can insert a simple removal tool 122 into one of grooves 120 to access one of slots 118 and apply leverage to orifice plate 74 against the surface of groove 120, easily removing it from the opening of head 56. Tool 122 is designed to fit grooves 120 and slots 118, and may be in the form of a bar having a bent end although it is understood that any other suitable lever could also be used.

Head 56 is provided at its opening with lugs 124, and orifice plate 74 is provided with corresponding recesses 126 within which lugs 124 are received, to ensure proper positioning of orifice plate 74 within the open end of head 56 such that slots 118*a*, 118*b* are aligned with grooves 120*a*, 120*b*. Alternatively, it is contemplated that grooves 120*a*, 120*b* may be eliminated. In this embodiment, slots 118 in the side surface of orifice plate 74 are positioned so as to be exposed when mounting ring 58 is removed. That is to say, slots 118 have a sufficient width such that a portion of each slot 118 extends outwardly of the end of grinder head 56, and can be accessed by tool 122 upon removal of mounting ring 58. In this embodiment, tool 122 is levered against the end edge of grinder head 56 to apply an outward force on orifice plate 74.

Further alternate embodiments of the plate removal slots 118 are shown in FIGS. 10C-10-J, such as provision of a single slot 118 rather than a plurality of slots about the circumference of orifice plate 74; provision of a single slot 118 of varying dimensions; provision of a continuous slot 118 or multiple continuous slots 118 around the side edge of orifice plate 74; provision of a drilled hole serving as removal slot 118; and provision of a slot 118 that opens onto the grinding surface of orifice plate 74. Each of these embodiments may have advantages and disadvantages that may dictate for or against use in a given circumstance. For example, the continuous slot(s) 118 shown in FIGS. 10-D and 10-E are more expensive to produce than some of the other embodiments, but have the advantage of not requiring alignment with any corresponding structures, such as grooves 120, of grinding head 56. Conversely, the embodiment shown in FIG. 10-I is relatively inexpensive to produce, but may require greater care in reassembly to assure alignment with a corresponding structure of grinding head 56, may require a non-standard tool 122 for removal, and may require additional effort for removal.

5. Fluted Collection Passages

Referring now to FIG. 7, orifice plate 74 has an outer section 128 that includes a large number of relatively small grinding openings 130, and an inner section 132 that includes a series of radially spaced collection passages 134. The size of grinding openings 130 varies according to the type of material being ground and the desired end characteristics of the ground material. In accordance with known grinding principles, material within head 56 is forced toward orifice plate 74 by rotation of feed screw 64 and through openings 130, with rotating knife assembly 66 acting to sever the material against the inner grinding surface of orifice plate 74 prior to the material passing through openings 130.

Figure 8:
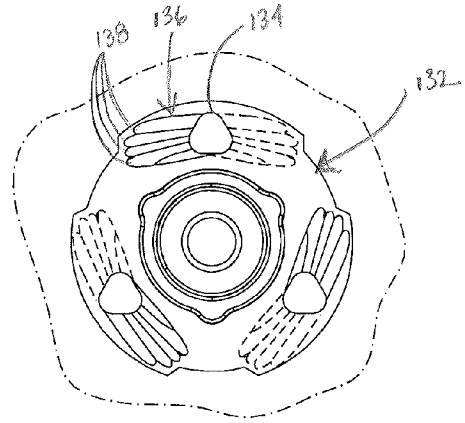
FIG. 8 is a top plan view of the inner section of the orifice plate shown in FIG. 7.

In some instances, pieces of hard material, such as bone or gristle, which are too large to pass through grinding openings 130, will be present along with the useable material. These pieces, which are not readily cut by the action of knife inserts 72*a-f* against plate 74, are pushed toward inner section 132 of plate 74 by the rotating action of knife assembly 66, where the pieces of hard material can be removed from the primary ground material stream through collection passages 134. Collection passages 134 are large relative to grinding openings 130, and, as best seen in FIGS. 7 and 8, are preferably generally triangular, though other shapes are certainly possible. Each of collection passages 134 is provided with a ramped entryway 136 opening onto the surface of orifice plate 74.

In the past, collection passages have been provided with smooth ramped entryways devised to encourage movement of hard pieces toward and through the collection passages. In order to encourage hard materials that migrate to inner section 132 to enter and move through collection passages 134, the present invention includes a ramped entryway 136 having a series of axial flutes or grooves 138, additionally shown in FIGS. 8 and 9. Flutes 138 provide a high friction surface that serves to maintain the pieces of hard material within the recessed area defined by the ramped entryway 136, and also function to guide material in an axial direction along ramped entryway 136 toward collection passage 134. In addition, flutes 138 can be formed in orifice plate 74 in a process using repetitive passes of a conventional end mill. This production process is relatively simple in comparison to the machining process required to form the smooth ramped entryways as used in the past, thus providing the additional advantage of lowering the cost of production of the orifice plate 74.

Referring back to FIG. 3, collection passages 134 lead through plate 74 to a collection cone 90, which keeps material that enters passages 134 separate from the primary ground material stream. Collected material accumulates in collection cone 90, where it can be subjected to a secondary grinding and/or separation process to maximize ground material output.

Ramped entryways 136 are provided on both sides of plate 74, which is double sided to double the lifetime of use of plate 74, and plate 74 is provided with a wear indicator 140 on each side. Wear indicators 140 are shallow recesses located at the edge of plate 74 so that the operator can visualize when a particular plate is so worn that it should be turned or, if both wear indicators 140 indicate worn surfaces, the operator will be alerted to replace plate 74 altogether.

6. Alternate Orifice Plate Providing Secondary Grinding

Another embodiment of orifice plate 74 is shown at 74' in FIGS. 13 and 14, and like parts are indicated by the same reference number with the addition of the prime symbol. In this embodiment, inner section 132' of plate 74' has additionally been provided with two secondary grinding sections 142. Secondary grinding sections 142 have smaller grinding openings 144 than the primary grinding openings 130' in outer section 128', although it is understood that secondary grinding openings 144 may have any other size relative to the primary grinding openings 130'. To accommodate the placement of secondary grinding sections 142 in inner section 132', preferably only one of the three collection passages 134' is provided with a ramped entryway 136'.

Because hard material is carried in a substantial quantity of soft, usable material, in this embodiment, material that is pushed toward inner section 132' has another opportunity to enter the primary material stream via secondary grinding sections 142. While hard material is being routed toward and into collection passages 134', knife inserts 72*a-f'* continue to rotate and shear materials at inner section 132' of plate 74', processing the materials into smaller portions and further separating hard material from the soft material to which it is attached. Thus, during the process of separating and removing hard material, additional usable material is acquired. Such material is small enough to enter secondary grinding openings 144, and is introduced into the main ground material stream rather than being collected in the collection cone such as 90 (not shown in FIGS. 13 and 14) for subsequent separation from unusable material. In this embodiment, the collection cone (not shown) is modified to cover only the portion of inner section 132' having collection passages 134', and leaves the downstream surface of orifice plate 74' exposed at secondary grinding sections 142 in order to allow material that passes through openings 144 to return to the usable material stream.

7. Self-Correcting Orifice Plate Installation

As previously discussed with reference to removal of orifice plate 74 from the opening of head 56, head 56 is provided with lugs 124 and plate 74 is provided with recesses 126 so that on assembly, plate 74 will be oriented in head 56 to ensure that removal slots 118 and removal grooves 120 are aligned. In addition, when plate 74' having secondary grinding sections 142 is used, the collection cone (not shown) has a shape that allows it to collect materials from collection passages 134' but leaves secondary grinding sections 142 exposed. Orifice plate 74' and the collection cone (not shown) must therefore also be aligned.

In order to ensure alignment of orifice plate 74' and the collection cone (not shown) with each assembly of grinder 54, each of lugs 124' and each of recesses 126' are also preferably of a different size. As seen in FIG. 7, a larger lug 124*a'* corresponds with a larger recess 126*a'* and a smaller lug 124*b'* corresponds with a smaller recess 126*b'* so that when an operator assembles grinder 54, plate 74' will only fit into head 56 in one way. The size difference between recesses 124*a*, 124*b* and lugs 126*a*, 126*b* is preferably large enough to allow a user to visualize the proper orientation of orifice plate 74', and to position plate 74' in head 56 properly on the first attempt. For example, in the illustrated embodiment, one recess is approximately 2 inches long and the other is approximately 1.5 inches long. However, if the operator should misjudge the sizes and attempt to replace plate 74' in the wrong orientation, the operator will quickly realize that orifice plate 74' is improperly oriented and will correct its orientation so that it fits properly within head 56.

8. Self-Correcting Plate Guard Mounting

Figure 15:
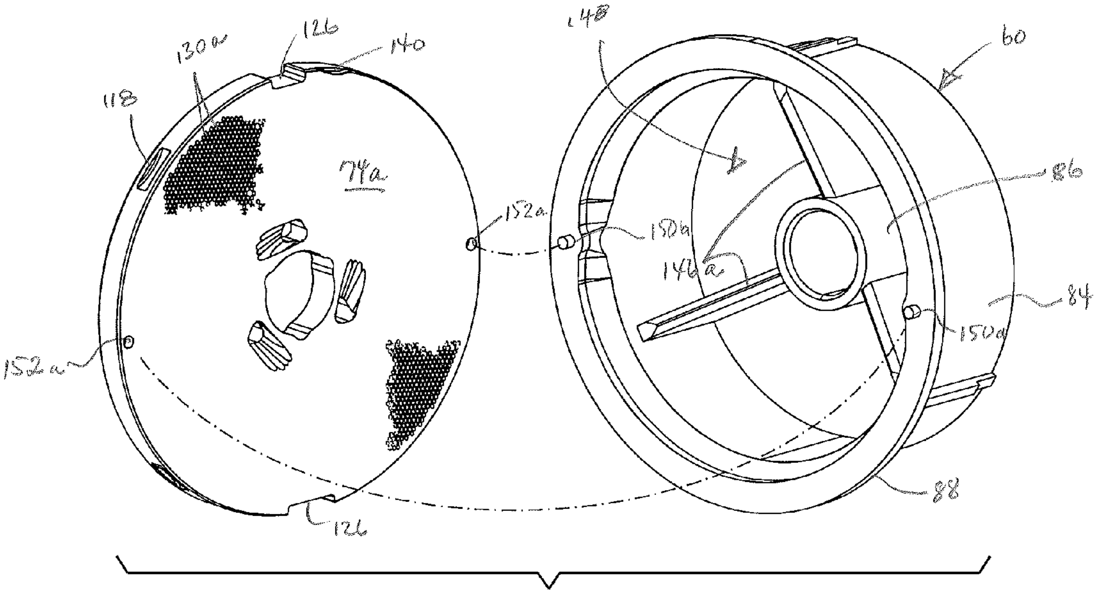
FIG. 15 is an isometric view of a first orifice plate and plate guard in accordance with one aspect of the present invention.
Figure 16:
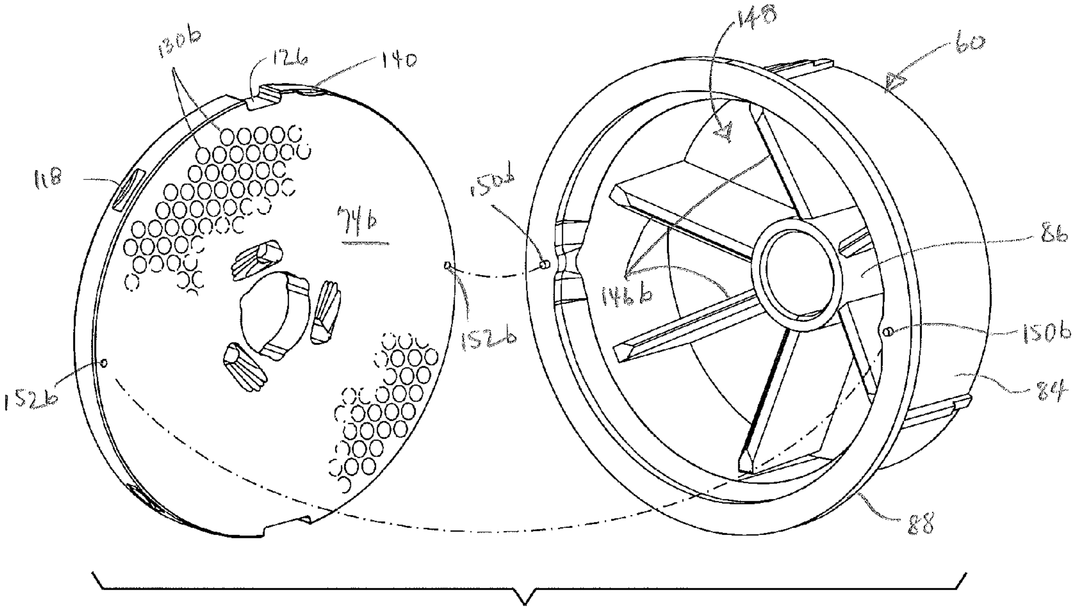
FIG. 16 is an isometric view of a second orifice plate and plate guard.

In a conceptually similar vein, the present invention provides a plate guard installation system that requires the operator to install a plate guard and further to install the correct guard for the orifice plate being used. As seen in FIGS. 15 and 16, plate guards 146 are carried on bridge 60 and have openings 148 and studs 150. Guards 146 are used to ensure that an operator or other personnel cannot access the area of grinder head 56 adjacent the outer surface of orifice plate 74 when orifice plate 74 has grinding openings 130 that exceed a predetermined size, e.g. ¼ inch or more. It is generally advantageous to use a guard 146 that provides maximum visibility so that the operator can view the product as it is being ground, so an orifice plate 74 having small grinding openings 130 allows the use of a guard 146 with larger openings 148, while an orifice plate 74 having larger grinding openings 130 requires the use of a guard 146 with smaller openings 148.

Figure 17:
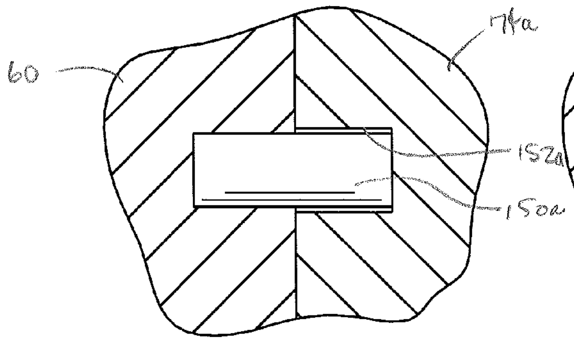
FIG. 17 is a close-up sectional view of the connection between the orifice plate and orifice plate guard shown in FIG. 15.
Figure 18:
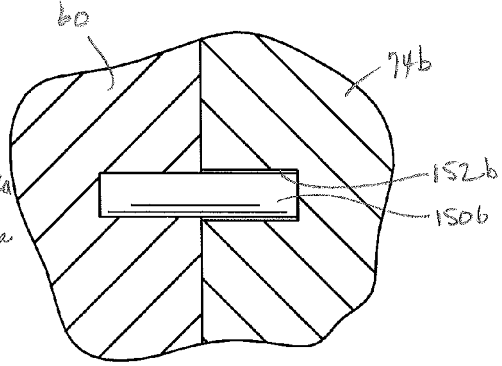
FIG. 18 is a close-up sectional view of the connection between the orifice plate and orifice plate guard shown in FIG. 16.
Figure 19:
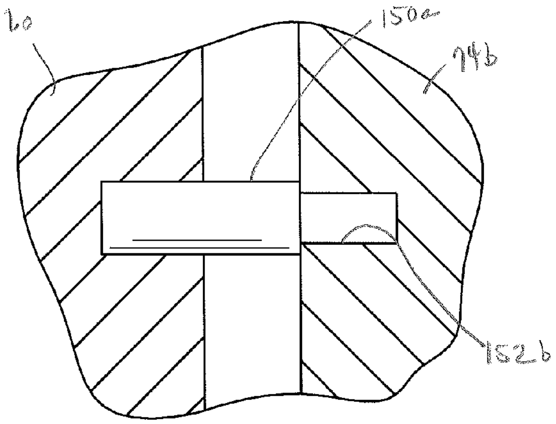
FIG. 19 is a close-up sectional side view of a portion of the orifice plate shown in FIG. 16 and a portion of the orifice plate guard shown in FIG. 15, showing that the orifice plate guard of FIG. 15 cannot be installed on the orifice plate of FIG. 16.
Figure 20:
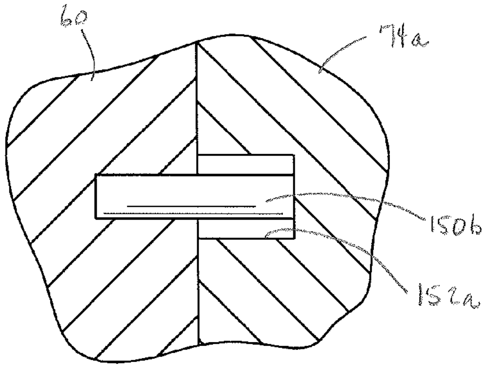
FIG. 20 is a close-up sectional side view of the orifice plate shown in FIG. 15 and the orifice plate guard shown in FIG. 16, showing the mismatched connection.

Referring to FIGS. 17-18, studs 150 are designed to be received within a pair of apertures 152 located on orifice plate 74. In order to ensure that an operator installs a plate guard 146, mounting ring 58 is sized so that it cannot be tightened sufficiently into engagement with stop 111 without the presence of guard 146. Furthermore, studs 150 and mounting apertures 152 are sized so that each guard 146 is matched to a particular orifice plate 74. As illustrated in FIGS. 15 and 16, plates 74*a* having small grinding openings 130*a* thus have large apertures 152*a* matching the large studs 150*a* of relatively unrestricted guards 146*a*, while plates 74*b* having larger grinding openings 130*b* have smaller apertures 152*b* matching the smaller studs 150*b* of relatively restricted guards 146*b*. With this construction, the smaller studs 150*b* of a restricted guard can either be mounted to a plate with small grinding openings 130*a* (with large apertures 152*a*), as seen in FIG. 18, or a plate having larger grinding openings 130*b* (with small apertures 152*b*), as seen in FIG. 20. However, a plate 74 with larger grinding openings 130*b* (and small apertures 152*b*) can only accept the smaller studs 150*b* of the restricted guard 146*b*. As a result, an operator cannot operate grinder 54 without a guard 146 in place, and if an operator tries to use a less restrictive guard than recommended for the size of grinding opening of the plate being employed, the studs of the guard will not fit in the apertures of the plate, as seen in FIG. 19, and the correct, more restrictive guard must be installed before grinder 54 can be assembled in an operative manner.

9. Wear-Reducing Bushing and Center Pin Design

At the interface between moving parts of grinder 54, there are substantial forces and pressure between the parts that cause the parts to wear. For example, as previously discussed, the rotating action of knife assembly 66 against orifice plate 74 causes wear of knife inserts 72*a-f*, which can be replaced, and also wear on plate 74, which is two-sided to double its lifetime of use and which bears wear indicators 140 so an operator can visualize the degree of wear.

Wear also occurs between orifice plate 74 and bushing 98, and between feed screw 64 and center pin 92. In prior systems, the bushing was held in place within the center bore of the plate and the pin was held in place within the center bore of the feed screw by way of a single pin or key/keyway arrangement. Over time, pressure on the bushing and pin caused them to wear and, because of the single orientation of the parts, the wear pattern occurred primarily in one location due to the pressures and forces experienced during operation. Although only one location was worn, the entire part would have to be replaced.

In the present invention, the life of bushing 98 and pin 92 is extended by allowing alternate positions for each part, thus distributing wear more evenly and extending part life. As seen in FIG. 9, bushing 98 is preferably provided with a number of projections 154 and orifice plate 74 is provided with a corresponding number of recesses or channels 156. In the illustrated embodiment, bushing 98 has three projections 154 and orifice plate 74 has three channels 156, although it is understood that any number of projections and channels may be used. When grinder 54 is disassembled for cleaning and reassembled, bushing 98 is randomly inserted into plate 74 in any of three positions. Over the life of bushing 98, the random insertion in one of three positions allows the part to wear evenly and triples its life expectancy. If desired, however, the operator may note the locations of the projections and channels prior to each disassembly, and take appropriate steps upon reassembly to ensure that bushing 98 is assembled to orifice plate 74 in a different orientation.

Likewise, as shown in FIG. 23, pin 92 is preferably provided with three recessed keyways 100 and knife holder 68 is provided with a corresponding number of keys 102. Knife holder 68 is mounted in turn on feed screw 64 as shown in FIGS. 2 and 3. When grinder 54 is disassembled and reassembled, pin 92 is inserted in central bore 94 of feed screw 64, and knife holder 68 is placed in position on pin 92 in any of three positions. Over the life of pin 92, random installation of knife holder 68, which rotates with feed screw 64, in one of the three positions allows pin 92 to wear evenly and extends its life expectancy. If desired, however, the operator may note the locations of the keys and keyways prior to each disassembly, and take appropriate steps upon reassembly to ensure that knife holder 68 is placed in position on pin 92 in a different orientation.

This feature of the present invention contemplates the provision of a corresponding number of projections and recesses at evenly spaced radial and circumferential locations between any two parts in a rotating assembly that is capable of being disassembled and reassembled, in order to distribute wear due to forces and pressures between the parts during operation of the assembly. While this feature of the invention has been shown and described in connection with the interface between the bushing and the orifice plate, as well as between the center pin and the knife holder, it is contemplated that a similar arrangement may be provided between any two parts that are adapted to be non-rotatably assembled together in any assembly.

10. Helical Discharge Passage

As previously discussed, hard material is carried in a substantial quantity of soft, usable material. As a result, in prior hard material collection systems, this has resulted in collection cavity 104 of collection cone 90 containing a quantity of usable material that would preferably not be discharged into collection tube 62 via discharge passage 106. To prevent as much usable material as possible from entering the discharge passage, the present invention includes a discharge passage 106 (FIG. 21) having a single, helical discharge flute 158. Flute 158 is helical in the direction of rotation of auger 108, and defines a discharge path for material advanced by rotation of auger 108. Helical flute 158 is formed in the peripheral wall that defines passage 106, which is sized relative to auger 108 to cooperate with the outer edges of flights 160 of auger 108 to provide a highly restricted flow of material from cavity 104 to tube 62. In this manner, the hard material is advanced through discharge passage 106 by rotation of auger 108 while the restriction provided by the size of the passage side wall and the outer edges of the flights of auger 108 provides sufficient backpressure to prevent soft material from entering collection cavity 104.

In addition, in another embodiment of the present invention, collection cavity 104 is replaced by discrete channels 156 that lead from collection passages 134 to cone 90. Channels 156 have side walls 162 so that hard material particles move directly toward auger 108. Particles thus have another opportunity to be sheared by the revolution of auger 108 against walls 162 and reduce the size of the hard material particles lodged in channels 156 before the particles are supplied to helical discharge flute 158.

Various alternatives and embodiments are contemplated as being within the scope of the following claims particularly pointing out and distinctly claiming the subject matter regarded as the invention.

We claim:

1. A grinding machine comprising:

a grinding housing;

a plurality of removable orifice plates with grinding openings, wherein the orifice plates are configured for assembly to the grinding housing, and wherein the size of grinding openings on each plate varies between plates, wherein a first orifice plate includes relatively small grinding openings and a second orifice plate includes relatively large grinding openings;

a plurality of removable guards configured for assembly to the grinding housing, wherein the guards have guard openings sized to correspond to the size of the grinding openings in an inverse fashion wherein a first guard having relatively large guard openings is adapted for use with the first orifice plate and a second guard having relatively small guard openings is adapted for use with the second orifice plate; and a means for assembling the guards to the housing that is configured such that the first and second guards can be assembled with the first orifice plate but only the second guard can be assembled with the second orifice plate.

2. The grinding machine of claim 1, wherein the means for assembling the guards to the housing comprises an arrangement of projections and apertures interposed between the guards and the orifice plates.

3. A grinding machine comprising:

a grinding housing;

a plurality of removable orifice plates with grinding openings, wherein the orifice plates are configured for assembly to the grinding housing, and wherein the size of grinding openings on each plate varies between plates;

a plurality of removable guards configured for assembly to the grinding housing, wherein the guards have guard openings sized to correspond to the size of the plate grinding openings in an inverse fashion; and a means for assembling the guards that ensures that a guard with relatively large guard openings is not used with an orifice plate having relatively large grinding openings, wherein the means for assembling the guards comprises an arrangement of projections and apertures interposed between the guards and plates, and wherein the arrangement of projections and apertures comprises a first projection and aperture arrangement having a first size for a first orifice plate having relatively small grinding openings and an associated first guard having relatively large guard openings, and a second projection and aperture arrangement having a second size for a second orifice plate having relatively large grinding openings and an associated second guard having relatively small guard openings, and wherein the first and second projection and aperture arrangements are configured such that the first and second guards can be assembled with the first orifice plate but only the second guard can be assembled with the second orifice plate.

4. A material grinder comprising:

a grinding head;

a plurality of orifice plates, each of which defines an inner grinding surface and an outer surface, and wherein each orifice plate has grinding openings;

a plurality of orifice plate guards, each of which is adapted to be installed adjacent the outer surface of an orifice plate, wherein each orifice plate guard has guard openings;

wherein the size of the guard openings of an orifice plate guard is relatively small for an orifice plate having relatively large grinding openings and wherein the size of the guard openings of an orifice plate guard is relatively large for an orifice plate having relatively small grinding openings;

a retaining ring for retaining the orifice plate in the grinding head during grinding, wherein the retaining ring is configured to prevent assembly of the material grinder without the orifice plate guard; and a mating engagement arrangement associated with the orifice plates and the orifice plate guards, wherein the mating engagement arrangement is configured such that an orifice plate guard having relatively small guard openings can be assembled with an orifice plate having relatively large grinding openings and with an orifice plate having relatively small grinding openings, and wherein an orifice plate guard having relatively large guard openings can be assembled only with an orifice plate having relatively small grinding openings.

5. The material grinder of claim 4, wherein the mating engagement arrangement comprises a projection and aperture arrangement interposed between the orifice plates and the orifice plate guards.

6. The material grinder of claim 5, wherein each orifice plate includes at least one mounting aperture, and each orifice plate guard includes at least one projection configured to be engaged within the mounting aperture of a selected one of the orifice plates.

7. The material grinder of claim 6, wherein each orifice plate includes two mounting apertures, and each orifice plate guard includes two projections corresponding to the mounting apertures of a selected one of the orifice plates.

8. A material grinder comprising:

a grinding head;

a plurality of orifice plates, each of which defines an inner grinding surface and an outer surface, and wherein each orifice plate has grinding openings;

a plurality of orifice plate guards, each of which is adapted to be installed adjacent the outer surface of an orifice plate, wherein each orifice plate guard has guard openings;

wherein the size of the guard openings of an orifice plate guard is relatively small for an orifice plate having relatively large grinding openings and wherein the size of the guard openings of an orifice plate guard is relatively large for an orifice plate having relatively small grinding openings;

a retainer for retaining the orifice plate in the grinding head during grinding; and a mating engagement arrangement associated with the orifice plates and the orifice plate guards, wherein the mating engagement arrangement is configured such that only an orifice plate guard having relatively small guard openings can be assembled with an orifice plate having relatively large grinding openings, and such that an orifice plate guard having relatively large guard openings can be assembled with an orifice plate having relatively small grinding openings.

9. The material grinder of claim 8, wherein the retainer comprises a retaining ring that is configured to prevent assembly of the material grinder without an orifice plate guard.

10. The material grinder of claim 8, wherein the mating engagement arrangement is configured such that an orifice plate guard having relatively small guard openings can be assembled with both an orifice plate having relatively large grinding openings and with an orifice plate having relatively small grinding openings.

11. The material grinder of claim 8, wherein the mating engagement arrangement comprises an arrangement of projections and apertures interposed between the guards and the orifice plates.

12. The material grinder of claim 11, wherein each orifice plate includes at least one aperture, and each orifice plate guard includes at least one projection configured to be engaged within the aperture of a selected one of the orifice plates.

* * * * *